Patented Dec. 12, 1944

2,364,818

UNITED STATES PATENT OFFICE 2,364,818

DIFLUOROALKANES

Mary W. Renoll, Oakwood, Ohio, assignor to Monsanto Chemical Company, a corporation of Delaware No Drawing. Application February 23, 1942, Serial No. 432,095

6 Claims. (Cl. 260—653)

This invention relates to a process for the preparation of difluorinated derivatives of paraffinic hydrocarbons and to certain new difluoroalkanes. More specifically, the present invention deals with the method for the preparation of difluoroalkanes whereby a mono-chlorinated olefin is reacted with hydrogen fluoride in such a manner as to yield a difluorinated paraffin of the structure:

$$R.CH_2.CF_2.R'$$

where R is hydrogen or an aliphatic hydrocarbon residue containing from 1 to 8 carbon atoms and R' is an aliphatic hydrocarbon residue containing from 1 to 8 carbon atoms.

The preparation of difluorinated paraffins of the above described structure has been hitherto generally effected by the reaction of analogously dichlorinated paraffins with antimony trifluoride, the two chlorine atoms being replaced by two fluorine atoms. As is well known to those skilled in the art, fluorination with antimony trifluoride often results in the formation of tarry by-products and consequent poor yields of desired product. Moreover, when the antimony trifluoride method is applied to other than very low boiling compounds, it is tedious in that it involves a separation of the antimony compound from the reaction mixture.

An object of the present invention is the provision of an improved, new method for the preparation of difluoroalkanes having two atoms of fluorine attached to the same carbon atom. Another object of the present invention is the preparation of the new difluoroalkanes, 3,3-difluoropentane, 2,2-difluoro-4-methylpentane and 2,2-difluorooctane. Other objects of the invention will be hereinafter disclosed.

These objects have been accomplished in the present invention whereby anhydrous hydrogen fluoride is reacted with mono-chloroolefins having the structure:

$$R.CH:CClR'$$

where R is hydrogen or an aliphatic hydrocarbon residue of from 1 to 8 carbon atoms and R' is an aliphatic hydrocarbon residue of from 1 to 8 carbon atoms. Mono-chloroolefins having the above defined structure may be readily prepared by treating aliphatic ketones with phosphorus pentachloride in known manner and also by dehydrohalogenation or dehalogenation of the appropriate chlorinated alkanes.

The addition of hydrogen fluoride to a dichlorinated olefin has been reported by Henne and Haeckl (J. Am. Chem. Soc. 63, 2692 (1941)). They reacted anhydrous hydrogen fluoride with $CH_2:CClCH_2Cl$ and obtained a 74% yield of the addition compound, $CH_3CClFCH_2Cl$, together with a 4% yield of the difluoride, $CH_3CF_2CH_2Cl$. Now, I have found that when mono-chloroolefins of the above structure are subjected to the action of anhydrous hydrogen fluoride, high yields of difluorides are obtained and substantially no addition products are formed. It could not be anticipated from the work of Henne and Haeckl that mono-chloroolefins would react with anhydrous hydrogen fluoride to give good yields of difluoroalkanes.

According to the present invention a mono-chloroolefin, for example, 2-chloropentene-1 is reacted with anhydrous hydrogen fluoride to yield a difluorinated alkane, for example 2,2-difluoropentane, according to the equation:

$$CH_2:CClCH_2CH_2CH_3 + 2HF \rightarrow$$
$$CH_3CF_2CH_2CH_2CH_3 + HCl$$

Here a small fraction of the hydrogen chloride evolved combines with the original mono-chloroolefin to give 2,2-dichloropentane, which may be readily separated from the reaction mixture by distillation. The addition compound, $$CH_3CClFCH_2CH_2CH_3$$

was not formed in sufficient quantities to permit isolation of a pure sample.

In practice I prefer to operate as follows: I mix the mono-chloroolefin with the stoichiometrical quantity of liquid anhydrous hydrogen fluoride at dry-ice temperature in a stainless steel pressure vessel equipped with gauge, valve and dephlegmator which is filled with solid carbon dioxide in order to facilitate removal of hydrogen chloride from the reaction mixture. The mixture is brought to the suitable reaction temperature within a period of several hours, and held at this temperature by means of a water-bath for two hours. The suitable reaction temperature is one at which hydrogen chloride is evolved smoothly and steadily and is generally within the range of from 35° C. to 50° C., being dependent upon the individual mono-chloroolefin used. When the pressure reaches approximately 50 pounds gauge, a slow rate of purge is started and increased slightly as reaction proceeds. The maximum pressure attained during the purging is generally from approximately 80 to 100 pounds gauge and is not allowed to exceed 150 pounds gauge. After removing the source of heat, the reaction container is allowed to stand in the water-bath for 18 hours. Usually, when the reaction mixture has attained room-temperature, purging is discontinued. The cooled reaction mixture is poured into an ice-water mixture, shaken well, and neutralized exactly. After steam-distillation, the organic layer is separated from the steamed product and dried over calcium chloride. A single distillation through a Vigreux column isolates the difluoride in a state of high purity.

When the reaction is effected according to the procedure described above, it proceeds smoothly, does not escape control, and involves substantially no loss of hydrogen fluoride. No tar-like products are formed. The above procedure involves removal of hydrogen chloride formed during the reaction; however, the removal of hydrogen chloride during the reaction does not constitute an essential part of this invention. Reactions in which hydrogen chloride is not removed may be carried out analogously to the procedure described above, but such reactions result in somewhat lowered yields of the difluorides, due to the increased formation of dichloride by addition of hydrogen chloride to the original mono-chloro-olefin.

The following examples illustrate a number of ways in which the principle of the invention has been employed but are not to be construed as limiting the invention:

Example 1

2,2-difluoropentane: 189 g. of 1.81 moles of 2-chloropentene-1 was mixed at dry ice temperature with approximately 75 g. (3.75 moles) of liquid anhydrous hydrogen fluoride in a stainless steel pressure vessel equipped with gauge, valve and dephlegmator filled with solid carbon dioxide. The temperature was slowly allowed to rise to 30° C. at which time a pressure of 50 pounds gauge was attained and purging was initiated. A total of 2 hours was used to bring the temperature up to 43° C., and the reaction mixture was held at this temperature for an additional two hours, a pressure of below 80 pounds gauge being maintained by purging during this time. At the end of this period the source of heat was removed and the reaction vessel was allowed to stand in the water bath at room temperature for 18 hours. The product was isolated by pouring the reaction mixture into an ice water mixture, shaking well, neutralizing exactly and steam-distilling the whole. The organic layer obtained was separated, dried over calcium chloride and distilled through a Vigreux column. There was thus obtained 125.5 g. (64.1% yield) of 2,2-difluoropentane, B. P. 60.1° C./760 mm. and $n_D^{20}$ 1.3360, together with 35.5 g. (13.9%) of 2,2-dichloropentane.

Example 2

In repeating the procedure of Example 1, but making no provision for the removal of hydrogen chloride, a 53.4% yield of 2,2-difluoropentane was obtained. Here there was an increase in formation of 2,2-dichloropentane, a 24% yield of this product being obtained.

Example 3

2,2-difluoro-4-methylpentane: 179 g. or 1.51 moles of 2-chloro-4-methylpentene-1 was reacted with approximately 62 g. or 3.1 moles of liquid anhydrous hydrogen fluoride according to the procedure of Example 1, except that the reaction temperature was 37° C.–38° C. and the pressure was kept below 100 pounds gauge. There was obtained 130 g. (70.5% yield) of the hitherto unknown 2,2-difluoro-4-methylpentane, B. P. 78.2° C./760 mm., F. P. −112.7° C., $n_D^{20}$ 1.3515, $d_4^{20}$ 0.8882, $MR_D$ (observed) 29.705, $AR_F$ 0.999. Analysis of the compound gave 31.4% fluorine; theoretical for $C_6H_{12}F_2$ is 31.1% fluorine. There was also obtained 24 g. of the dichloride, 2,2-dichloro-4-methylpentane.

Example 4

Example 3 was repeated except that, as in Example 2, no provision was made for the removal of hydrogen chloride. Here there was obtained a 62.9% yield of 2,2-difluoro-4-methylpentane, together with a 14.9% yield of 2,2-dichloro-4-methylpentane.

Example 5

3,3-difluoropentane: 183 g. or 1.75 moles of 3-chloropentene-2 was reacted with 72 g. or 3.6 moles of liquid anhydrous hydrogen fluoride according to the procedure of Example 1, except that the reaction temperature was maintained at 40° C. There was obtained 113 g. (59.7% yield) of the hitherto unknown 3,3-difluoropentane, B. P. 60.8° C./760 mm., F. P. −94.0° C., $n_D^{20}$ 1.3390, $d_4^{20}$ 0.9106, $MR_D$ 24.825, $AR_F$ 0.868. Analysis of the compound gave 35.1% fluorine; theoretical for $C_5H_{10}F_2$ is 35.1% fluorine. There was also obtained 49.5 g. (20.1% yield) of 3,3-dichlorpentane.

Example 6

2,2-difluorobutane: 181 g. or 2 moles of the mono-chloroolefin mixture obtained by the reaction of phosphorus pentachloride with methyl ethyl ketone and comprising mainly

$CH_2:CClCH_2CH_3$ and a relatively small amount of

$CH_3CH:CClCH_3$ was reacted with 82 g. or 4.1 moles of anhydrous liquid hydrogen fluoride according to the procedure of Example 1, except that the reaction temperature was from 35° C. to 36° C. Due to the low boiling point of 2,2-difluorobutane, it was also necessary to modify the procedure of Example 1 in recovering the reaction product. Here the low boiling fraction of the product was distilled from the reaction vessel directly through a trap containing warm dilute caustic into a receiver cooled with dry ice. The higher boiling material remaining in the reaction vessel was poured on ice and processed as in Example 1. The dried reaction products were combined and fractionated to give 126 g. (67% yield) of 2,2-difluorobutane, B. P. 31.0° C./760 mm., $n_D^{10}$ 1.3189. There was also obtained 31 g. of 2,2-dichlorobutane.

Example 7

2,2-difluorooctane: 179 g. or 1.22 moles of the mono-chloroolefin obtained by the reaction of phosphorus pentachloride with methyl n-hexyl ketone and probably comprising substantially $CH_3CCl:CH(CH_2)_4CH_3$ was reacted with 50 g. or 2.5 moles of anhydrous liquid hydrogen fluoride according to the procedure of Example 1 except that the reaction temperature was maintained at from 44° C. to 46° C. and the pressure was kept at below 60 pounds gauge by means of purging. Upon fractionation under partial vacuum there was obtained 108 g. (58.9% yield) of the hitherto unknown 2,2-difluorooctane, B. P. 66.2° C. to 66.6° C./60 mm., 136.3° C. to 136.6° C./760 mm., freezing point —50.0° C., $n_D^{20}$ 1.3766, $d_4^{20}$ 0.8867, $MR_D$ 38.924, $AR_F$ 0.990. Analysis of the compound gave 25.2% of fluorine; theoretical for $C_8H_{16}F_2$ is 25.3% fluorine. There was also obtained 20 g. of the dichloride, 2,2-dichlorooctane, and 32 g. of a higher boiling liquid of undetermined composition.

Although the above examples illustrate a batchwise operation of the present process, the reaction of anhydrous liquid hydrogen fluoride with the mono-chloroolefins of this invention may be effected continuously or intermittently. The reaction may be performed under ordinary or increased pressure, but advantageously provision should be made for the removal of evolved hydrogen chloride. As can be readily appreciated by those skilled in the art, reaction between the anhydrous hydrogen fluoride and the mono-chloroolefin should be preferably effected at moderate temperatures.

The difluoroalkanes of the present invention are very stable compounds, being more stable to heat than the corresponding dichlorides. They are less inflammable than the corresponding hydrocarbons and have a slight odor which resembles that of the corresponding hydrocarbons. The lower members have boiling point and freezing point properties which recommend them for use as refrigerants. The fact that the difluoroalkanes of this invention dissolve lubricating oils, but do not dissolve paraffin, makes them valuable as dewaxing agents in the petroleum industry. Since the presence of the two fluorine atoms facilitates extensive chlorination, the difluoroalkanes of the present invention find application as intermediates in the preparation of highly chlorinated difluoroalkanes.

What I claim is:

1. The process for producing difluoroalkanes comprising mixing a monochloroolefin with anhydrous hydrogen fluoride at a temperature at which there is substantially no reaction, raising the temperature of the mixture to effect a reaction and then cooling the reaction mixture.

2. The process for producing difluoroalkanes comprising mixing a monochloroolefin with anhydrous hydrogen at about the temperature of dry ice, raising the temperature of the mixture to effect a reaction and then cooling the mixture.

3. The process for producing difluoroalkanes comprising mixing a monochloroolefin with anhydrous hydrogen fluoride at about the temperature of dry ice, raising the mixture to a temperature substantially within the range of about 35° C. to about 50° C. and then cooling the mixture.

4. The process for the preparation of 2,2-difluoro-4-methyl pentane comprising mixing 2-chloro-4-methylpentene-1 with anhydrous hydrogen fluoride at a temperature at which there is substantially no reaction, raising the temperature of the mixture to effect a reaction and then cooling the reaction mixture.

5. The process defined in claim 4 in which the reaction is effected at a temperature substantially within the range of about 30° C. to about 50° C.

6. The process defined in claim 4 in which the reaction is effected at a temperature substantially in the range of about 30° C. to about 50° C. and at superatmospheric pressure.

MARY W. RENOLL.